No. 645,978. Patented Mar. 27, 1900.
W. L. SILVEY.
SECONDARY BATTERY.
(Application filed Nov. 20, 1899.)
(No Model.)
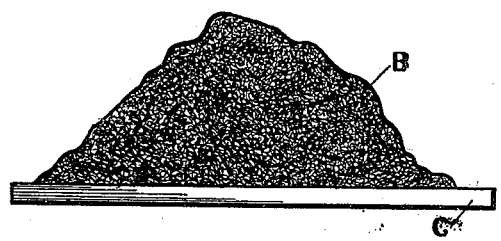
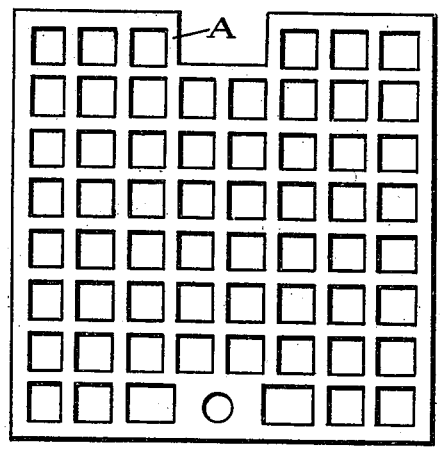
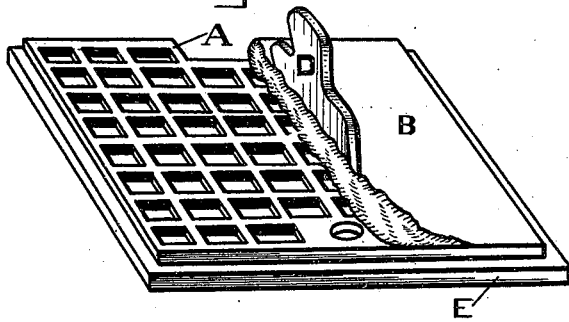
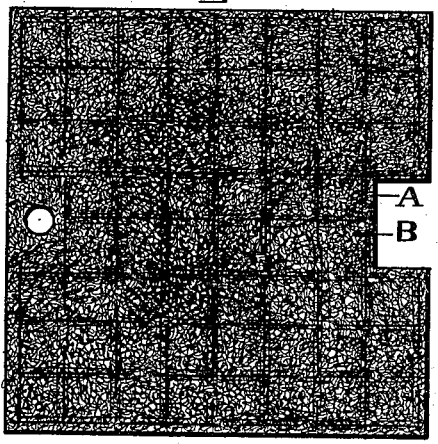
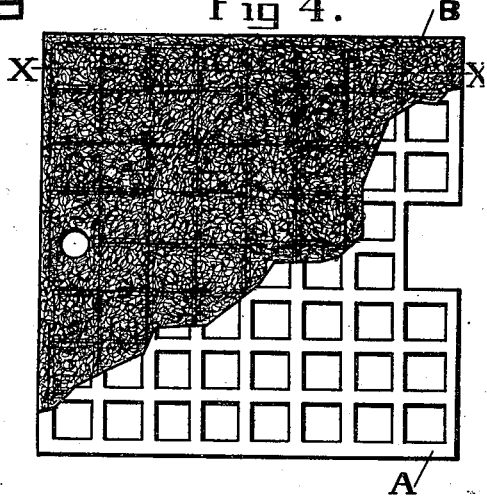
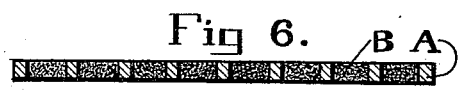
Attest.
Hugo. C. Colson.
N. G. Mitchell.
Inventor.
William L. Silvey

UNITED STATES PATENT OFFICE.

WILLIAM L. SILVEY, OF DAYTON, OHIO.

SECONDARY BATTERY.

SPECIFICATION forming part of Letters Patent No. 645,978, dated March 27, 1900.

Application filed November 20, 1899. Serial No. 737,604. (No model.)

*To all whom it may concern:*

Be it known that I, WILLIAM L. SILVEY, a citizen of the United States, and a resident of Dayton, in the county of Montgomery and State of Ohio, have invented certain new and useful Improvements in Secondary Batteries, of which the following is a specification, reference being had to the accompanying drawings, which are made a part hereof.

My invention relates, essentially, to a battery-plate of the Planté type; and it is the object of the present invention to facilitate the disintegration or so-called "forming" process, whereby active oxids are produced electrochemically from the body of the plate itself in contradistinction to the so-called "Faure" process, whereby the active oxids are applied to the plate mechanically prior to their being immersed in the battery solution.

In the original Planté type of secondary battery a sheet of lead or an alloy of lead with some other substance—such as antimony, tin, silver, gold, platinum, or analogous or equivalent metal—was employed, made into a sheet, rod, wire, corrugated, grooved, foliated, scored, pitted, ruled, or folded form. Each element was composed of two elements, positive and negative, and either prior to being formed or charged was treated with acids or alkalies, whereby the surfaces acted upon were made more susceptible to electrochemical action, or by a long series of charges and discharges from some electrical source was gradually disintegrated or broken down, whereby oxygen was occluded on one plate and hydrogen upon the other, which two substances are the essential elements for a lead secondary or storage battery at the present time, whether constructed by the Planté or by the Faure processes, my battery being of a strictly Planté type, in which no artificially-produced oxids are employed prior to charging the plate by an electric current, except, perhaps, the small percentage of oxygen which would naturally be included, such as would come from contact with the air in the preparation of the material of which the plate is composed. This plate may be termed a "composite" plate—that is, a conductor for receiving the electric current and distributing it and an active element for receiving and retaining the charge during the forming process or for producing the current and giving it off during the discharge. The conductor-plate may be of any suitable form. As I have already described, it may be perforated, a plain sheet of lead, a pocket, wire gauze or cloth, or any other convenient form.

Referring to the accompanying drawings, Figure 1 represents a side view of conductor-plate A with numerous perforations extending through it. Fig. 2 represents a mass of powdered metallic lead B on a platen C. Fig. 3 is a perspective view of a perforated battery-plate A, lying on a platen E, and a mass of filling being applied thereto by being spread with the spatula D. Fig. 4 shows a side view of a conductor-plate A partially filled with porous metallic-lead powder B. Fig. 5 shows a completed battery-plate; and Fig. 6 is a cross-section of Fig. 4 along the horizontal dotted line X X, showing the conductor-plate A with a porous filling B of powdered metallic lead.

In the case of which this specification forms the descriptive matter my device consists of a conductor A, which I have shown as a perforated metal plate, and a covering or filling for the perforations B. This filling B when the plate is complete and ready to be formed consists of metallic lead in a fine powder, the metallic lead constituting the active element of the plate. It is formed by dividing blue or metallic lead into a fine powder, known as "lead-dust," which is much more readily acted upon electrochemically than a solid mass of lead, and therefore it is the object in dividing this metallic lead to facilitate electrochemical action which takes place in forming a storage-battery plate electrochemically. Enough powdered metallic lead having been produced by dividing lead into minute particles, it is distributed over the conducting-plate A or into the perforations by mechanical means. In practice it has been found that the conducting-plate, while it may be of carbon, platinum, or pure metallic lead, is best composed of an alloy of lead and antimony, (about ninety per cent. metallic lead and ten per cent. of antimony,) which is less oxidizable than metallic lead alone. The powdered-lead filling prior to being placed in contact with the conductor is mixed with finely-ground sulfate of soda, which experience has shown should be from five per cent. to eight per cent., by weight, the two powders (lead and soda) being mixed in the dry state, to which are afterward added about two parts of water to each part of the soda sulfate. This makes a stiff paste and enables us to spread the mixture with a spatula D more evenly and more perfectly than if the powders were dry, although the addition of water where a press is employed for consolidating the material may be dispensed with. The plate having been filled by this mixture is now hung up to dry in contact with the atmosphere, by which a large percentage of the moisture is removed and the paste becomes stiff and thoroughly hardened, while the sulfuric acid held in union with the sodium comes in contact with the surface of the finely-divided metallic-lead particles and acts upon them so as to produce sulfate of lead, which has a tendency to bind the metallic-lead particles together and make them adhere to the conductor. The purposes of the addition of the sulfate of sodium to the mass are two, one to furnish acid for sulfating the particles of lead and the other to make the mass more porous than it would be possible were the lead-dust applied without this substance. After the plate has been exposed to the air and dried for a time the surface becomes covered with a white deposit of sulfate of soda mixed with sulfate of lead and the plates are ready for a continuation of the process, which consists in immersing them in water, in which they are allowed to remain until all or nearly all of the soda sulfate has been extracted, the soda going into solution, leaving the lead behind. Alum or sulfate of alumina may be employed as a substitute for the sulfate of sodium, but it is more expensive. I might use a number of other substances instead of sodium sulfate, but all would be more or less unsatisfactory. I therefore confine myself to a metallic sulfate freely soluble in water. After thoroughly soaking the plates in the liquid to remove the soluble sulfate and drying them they will be found to be very porous and ready for a continuation of the process. If the metallic-lead particles alone were employed, they would be found to adhere too closely together and would not be easily penetrable nor permit the electrochemical action to take place readily. Besides, when charging, the conversion into the active oxids would cause them to expand and break away from the conductor A; but a plate constructed as I have just described is sufficiently porous to permit of this expansion without disintegration, the expansion being provided for by the porosity of the plate. The plates having been soaked to remove the soluble sulfate of soda or alum (as the case may be) are either rough-dried or immersed in a pickling-bath of sulfuric acid and water of, say, 23° Baumé gage, in which they are thoroughly sulfated by remaining therein for a few hours, after which they are removed and dried, when they are ready for use by being assembled in suitable elements, immersed in a solution of sulfuric acid and water, and charged by an electric current, whereby they are converted into either positive or negative plates, according to the pole of the generator to which they have been attached.

It will be observed that this process differs from the original Planté method only so far as the methods employed in obtaining porosity of the material or active element is concerned.

Having described the essential features of my improved battery-plate, what I claim as new, and wish to secure by Letters Patent of the United States, is—

1. The process of making plates for a secondary battery, which consists in uniting a conductor-plate, finely-divided metallic lead, a metallic sulfate, and water, then drying the whole to remove the water and form an adherent mass and sulfate the finely-divided metallic-lead particles, and, finally, forming the metallic-lead particles and the sulfate of lead into oxid of lead by charging them with an electric current, as set forth.

2. The process of making the oxygen element for a secondary battery, which consists in mixing finely-divided metallic lead and sulfate of soda, then adding a liquid, and then drying the whole to extract the liquid and form an adherent mass, as specified.

3. The process of making an element for a secondary battery, which consists in mixing finely-divided metallic lead, an alkali sulfate, and a liquid to form a paste, then applying the paste to a metallic conductor, then extracting the liquid to convert the metallic lead and the sulfate into a strongly-coherent mass, then immersing the mass in a liquid to extract the soluble sulfate and leave the metallic particles in a porous condition.

4. The process of making an element for a secondary battery, which consists in mixing finely-divided metallic lead, an alkali sulfate, and a liquid, then removing the liquid by evaporation, then immersing the element in a liquid to extract the metallic sulfate and convert the metallic particles into a porous condition, and then immersing the element in a solution of sulfuric acid and hardening it, as set forth.

5. The process of making an element for a secondary battery, which consists in mixing finely-divided metallic lead, sulfate of soda, and a liquid, then extracting the liquid, then immersing the element in a liquid and extracting the soluble sulfate and converting the metallic particles into a porous condition, then immersing the element in a solution of sulfuric acid and water and charging it with an electric current.

In testimony whereof I have set my hand in the presence of two subscribing witnesses.

WILLIAM L. SILVEY.

Witnesses:
E. R. KIRBY,
FRANK BUCHANAN.